(12) United States Patent
Lucas

(10) Patent No.: US 9,881,028 B2
(45) Date of Patent: Jan. 30, 2018

(54) PHOTO-OPTIC COMPARATIVE GEOLOCATION SYSTEM

(71) Applicant: Fisher Vance Lucas, Huntsville, AL (US)

(72) Inventor: Fisher Vance Lucas, Huntsville, AL (US)

(*) Notice: Subject to any disclaimer, the term of this patent is extended or adjusted under 35 U.S.C. 154(b) by 215 days.

(21) Appl. No.: 14/796,688

(22) Filed: Jul. 10, 2015

(65) Prior Publication Data

US 2016/0012290 A1    Jan. 14, 2016

Related U.S. Application Data

(60) Provisional application No. 62/022,934, filed on Jul. 10, 2014.

(51) Int. Cl.
| | |
|---|---|
| *H04N 7/18* | (2006.01) |
| *G06F 17/30* | (2006.01) |
| *G01S 5/16* | (2006.01) |
| *G06K 9/00* | (2006.01) |
| *G06T 7/73* | (2017.01) |

(52) U.S. Cl.
CPC ............ G06F 17/3028 (2013.01); G01S 5/16 (2013.01); G06K 9/00671 (2013.01); G06T 7/74 (2017.01); *G06T 2207/30244* (2013.01); *G06T 2207/30252* (2013.01)

(58) Field of Classification Search
CPC .......... G01B 11/26; G01C 3/08; G01C 15/00; G01C 17/00
USPC .................................. 348/113–117, 142–160
See application file for complete search history.

(56) References Cited

U.S. PATENT DOCUMENTS 9,562,764 B2 *   2/2017   France ................... G01C 15/00

\* cited by examiner

*Primary Examiner* — Andy Rao
(74) *Attorney, Agent, or Firm* — Jeremy A. Smith; Kathleen Milano Best; Bradley Arant Boult Cummings LLP

(57) ABSTRACT

A photo-optic comparative geolocation system for calculating the location of an object has been developed. The apparatus includes optic sensors that capture surrounding location data, an interface that maps the optic sensor data, a storage database containing prior optical and location data, a digital sextant that provides data calculated using magnetic or celestial references, a data processor that compares the mapped data to stored data and calculates current location based on the comparison analysis, and a visual display for location information.

17 Claims, 7 Drawing Sheets

10

PHOTO-OPTIC COMPARATIVE GEOLOCATION SYSTEM

CROSS-REFERENCE TO RELATED APPLICATIONS

This application claims the benefit of, and priority to, U.S. Provisional Application No. 62/022,934 entitled "Photo-Optic Comparative Geolocation System" that was filed on Jul. 10, 2014.

BACKGROUND OF INVENTION

Many industries, both commercial and military in nature, utilize geolocation (i.e., location on the surface of the earth) systems for navigation, communications, and other purposes. In addition, personal use of geolocation systems has become prevalent in recent years. Typically, global positioning systems ("GPS") or other types of satellite or communications networks are used in order to calculate an exact location of the user.

Certain capabilities currently exist, but these methods of geolocation involve the transmission of signals, whether via satellite or other type of communications network. In some instances, a user may need to calculate his geolocation without the transmission of signals. For example, communication networks may be unavailable in some remote areas, making some geolocation devices or methods impossible. Alternatively, in some military applications it may be necessary for a user to avoid the transmission of any type of signals, whether satellite or otherwise, in order to avoid potential detection. Consequently, the need exists for a standalone system that is able to calculate geolocation of an object without utilizing any type of signal transmission.

SUMMARY OF THE INVENTION

In some aspects, the invention relates to a photo-optic apparatus for calculating geolocation of an object, comprising: an optic sensor that captures surrounding location data; an interface that maps the optic sensor data; a storage database containing prior optical and location data; a digital sextant that provides data calculated using magnetic or celestial references; and a data processor that compares the mapped data to stored data and calculate current location based on the comparison analysis and digital sextant data.

In other aspects, the invention relates to a photo-optic apparatus for calculating geolocation of an object, comprising: a camera for capturing surrounding image data, the camera located within an enclosure; an internal compass within the enclosure; a memory containing stored image and location data, the memory located within the enclosure; a data processor that performs automated comparison analyses of the stored data and camera data, the data processor located within the enclosure; and a screen to visually display output from the data processor.

BRIEF DESCRIPTION OF DRAWINGS

It should be noted that identical features in different drawings are shown with the same reference numeral.

DETAILED DESCRIPTION

A photo-optic comparative geolocation system has been developed. It should be understood that the present invention may be utilized in a broad range of commercial industries, including but not limited to transportation, telecommunications, and security. Additionally, the present invention may be used for personal or military purposes. The present invention provides the capability to calculate the geolocation of an object—without the need for any type of signal transmission over a network—by comparing digital map data with visually observable, optically captured reference points. Additionally, the present invention provides the capability to store various images relating to an object's geolocation, including surrounding landscape or architectural images. Features of the system include: the ability to capture surrounding image data; the ability to store image data within the system; an interface between initial image data and stored geolocation data; an internal digital sextant; a data processor; and the ability to calculate geolocation of an object based on automated and intelligent comparison of stored data with optically captured reference points in the surrounding area.

Figure 1:
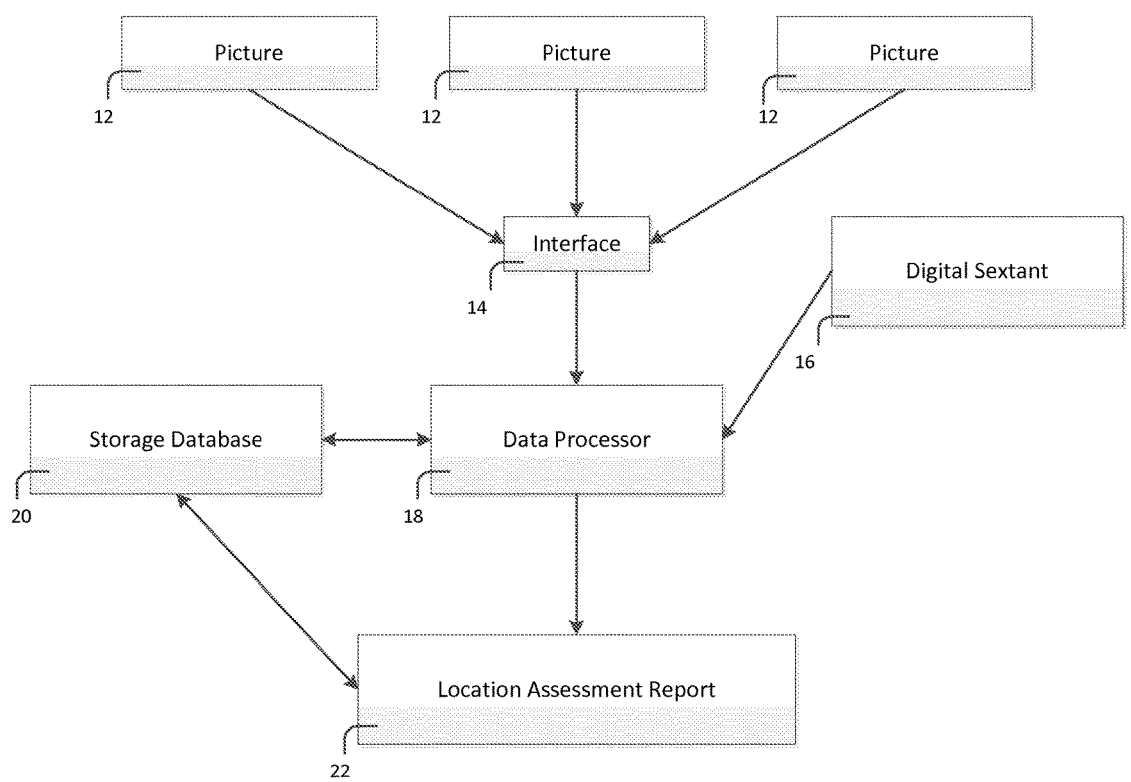
FIG. 1 shows a diagram of a photo-optic comparative geolocation system in accordance with one embodiment of the present invention.

FIG. 1 shows a diagram of a photo-optic comparative geolocation system 10 in accordance with one embodiment of the present invention. In this embodiment, at least one picture 12 is provided as input to the system 10. Although cameras are described below, it is contemplated that these pictures 12 or other types of image data may be provided through different means, such as other types of optical sensors. Each picture 12 is mapped through an interface 14, which labels or categorizes the digital image data and converts the digital image data into the format required by the data processor 18, if necessary. Once mapped by the interface 14, the image data is sent to a data processor 18, which may perform various functions, such as the creation of a compiled image or further categorization of image data. The data processor 18 also receives data from a digital sextant 16, which is more fully described below and shown in FIG. 2. Finally, the data processor 18 receives data from a storage database 20.

Generally, the data processor 18 compares image data received from the interface 14 with data received from the digital sextant 16 and/or the storage database 20. Data stored in the storage database 20 may include topographical maps, previous system 10 data, three-dimensional maps, landscape images, architectural images, known geophysical data, or other types of data. Data received from the digital sextant 16 may include location data determined from celestial objects, as further described below. In comparing current image data to the foregoing types of received or stored data, the data processor 18 may determine a geolocation by eliminating non-matching results, or by affirmatively detecting a corresponding image. Once a geolocation is determined, the data processor 18 may send analysis or assessment results to a user through a location assessment report 22. The assessment report 22 may be transmitted to the user through some type of visual display or other type of user interface.

Figure 2:
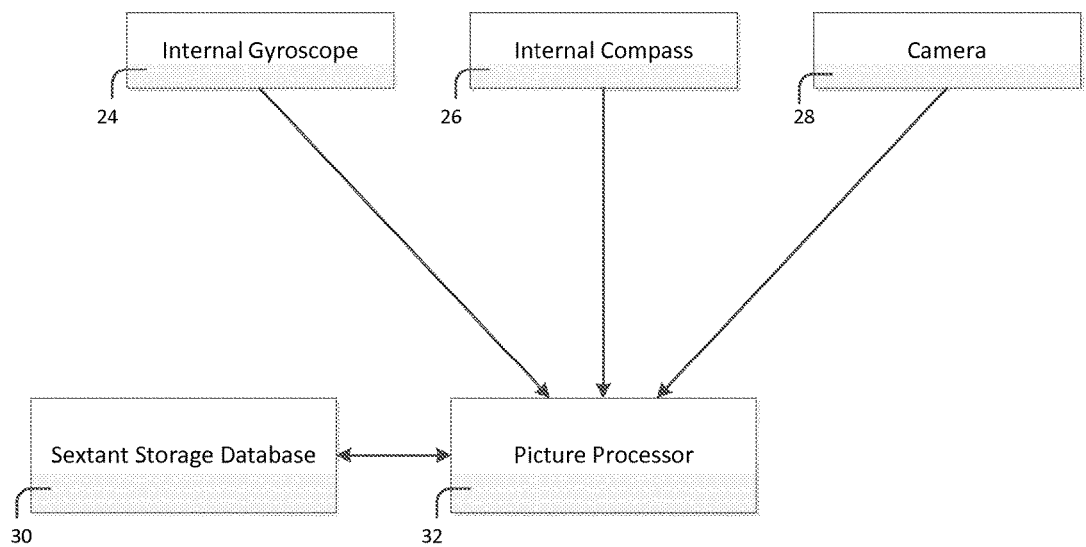
FIG. 2 shows a diagram of a digital sextant in accordance with one embodiment of the present invention.

FIG. 2 shows a diagram of a digital sextant 16, as shown in FIG. 1, in accordance with one embodiment of the present invention. In this example, the digital sextant 16 includes an internal compass 26, and an internal gyroscope 24 for stabilization. The internal gyroscope 24 may be a laser or fiber optic gyroscope, or it may be a conventional mechanical gyroscope. Additionally, the digital sextant 16 may include a camera 28 to assist with the recognition of celestial objects. A sextant storage database 30 provides the ability for the digital sextant to maintain star maps, or other types of sky maps or images as viewed from varying locations around the earth. The picture processor 32 provides the digital sextant 16 with the internal capability to compile data from each of the foregoing internal components and provide resulting location data.

Figure 3:
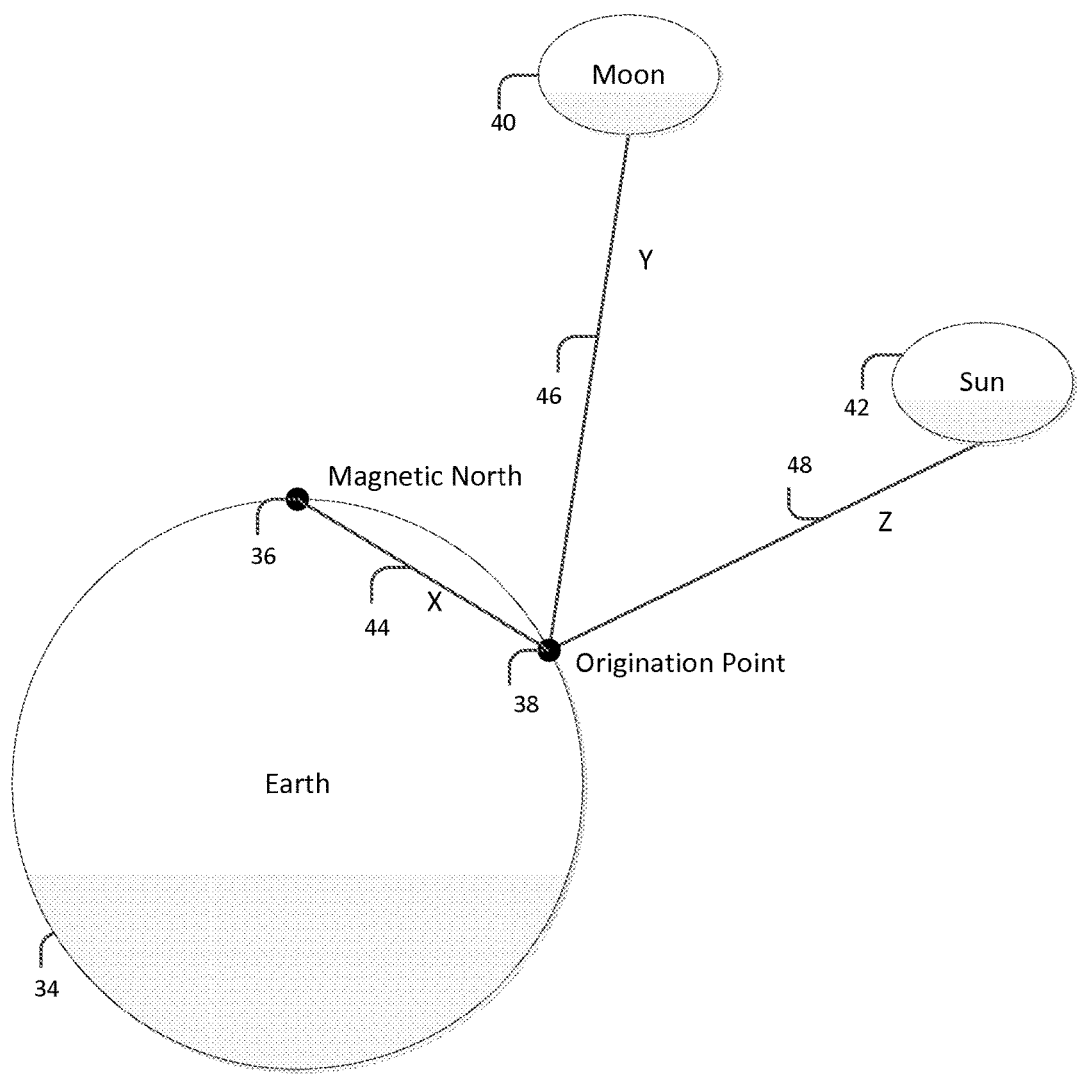
FIG. 3 shows an example of a method of geolocation calculation by a digital sextant in accordance with one embodiment of the present invention.

FIG. 3 shows an example of a method of geolocation calculation by a digital sextant 16 in accordance with one embodiment of the present invention. In this example, the digital sextant 16 requires three points of reference in order to provide a geolocation for the origination point 38. First, the digital sextant 16 may utilize an internal compass 26 to determine the user's position in relation to magnetic north 36. Next, the digital sextant 16 may calculate two more reference points using the sun 42 and moon 40 to measure angular height, resulting in lines of position for the origination point 38. Through these observations, the digital sextant 16 may determine an x-axis 44, a y-axis 46, and a z-axis 48, allowing the calculation of an approximate geolocation for the origination point 38.

Figure 4:
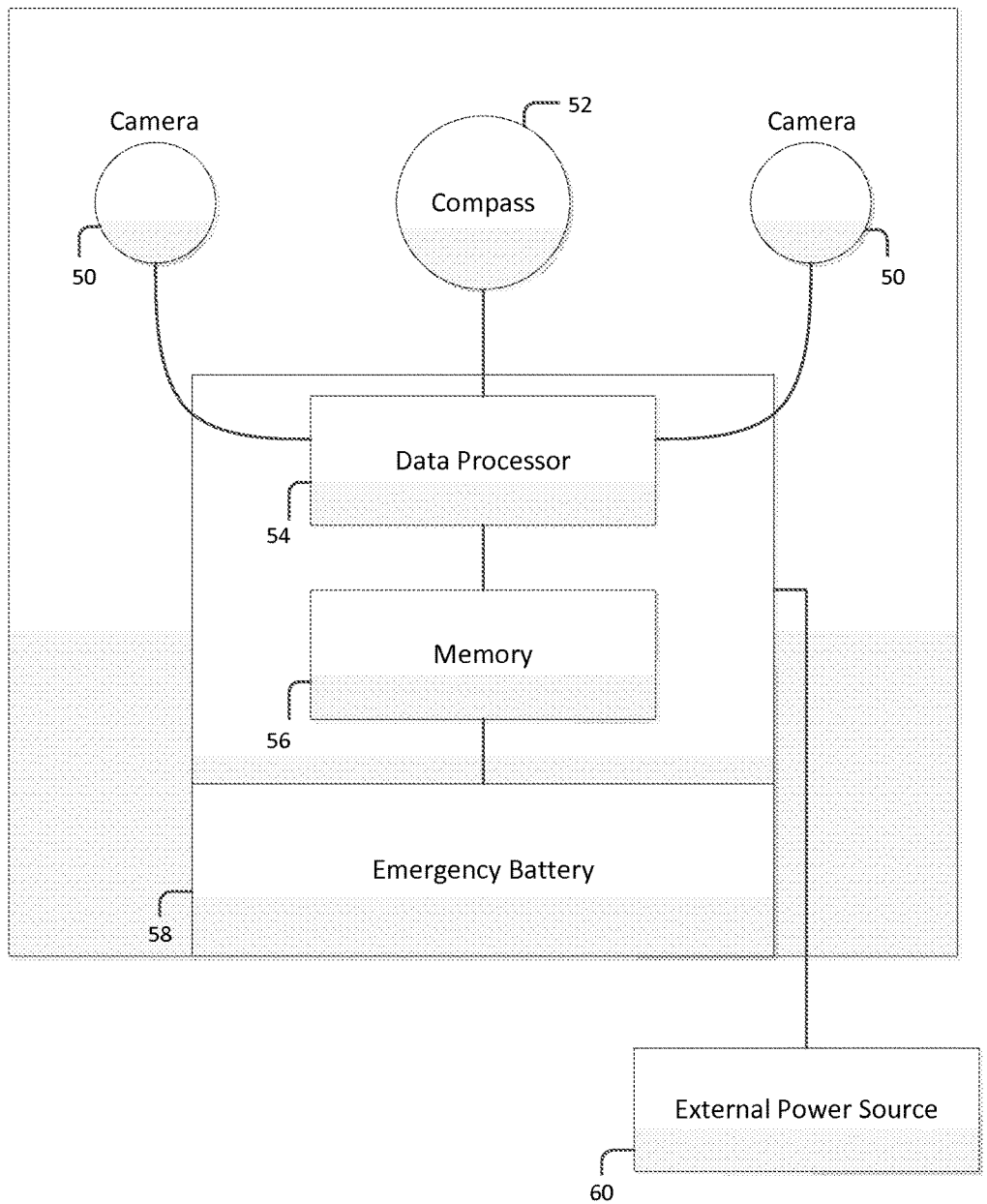
FIG. 4 shows a diagram of a photo-optic comparative geolocation system in accordance with another embodiment of the present invention.

FIG. 4 shows a diagram of a photo-optic comparative geolocation system in accordance with another embodiment of the present invention. In this embodiment, the system 10 may be mounted on a vehicle, such as an aircraft. The system may include multiple cameras 50 for different viewpoints and image data. For example, if mounted on an aircraft, one camera 50 may be mounted on the lower portion of the fuselage in order to capture surrounding images for the landscape below during flight, while another camera 50 may be mounted on the upper portion of the fuselage to provide image data for the sky. The system 10 may also include a compass 52 for additional data. In this embodiment, the system 10 includes a data processor 54 and memory 56, which provide functions similar to those described in FIG. 1 above for the data processor 18 and storage database 20. While mounted on a vehicle, the system 10 can be powered by an external power source 60, but an emergency battery 58 may be included in the event of a loss of external power.

Figure 5:
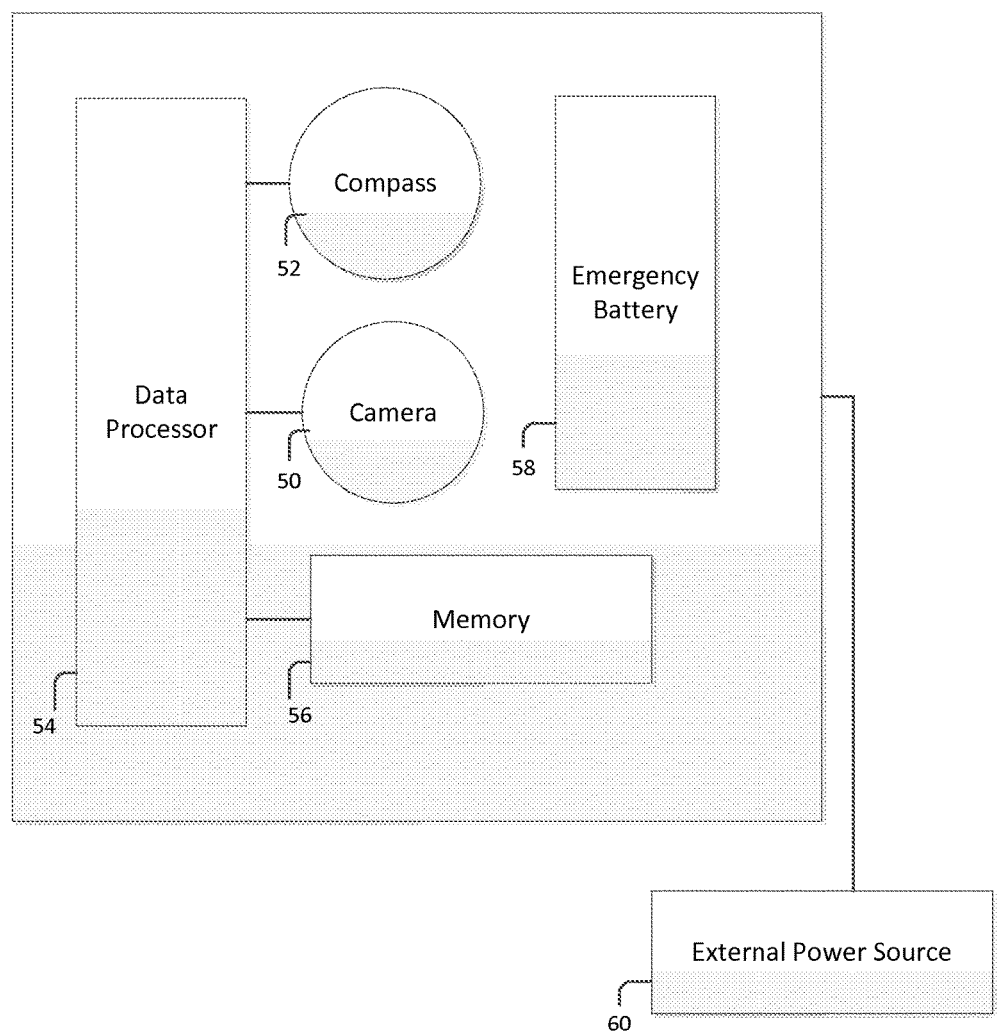
FIG. 5 shows a diagram of a photo-optic comparative geolocation system in accordance with another embodiment of the present invention.

FIG. 5 shows a diagram of a photo-optic comparative geolocation system in accordance with another embodiment of the present invention. In this embodiment, the system 10 may again be mounted on a vehicle, such as a nautical vessel. Due to varying requirements of different vehicles, only one camera 52 may be included. Although the remaining components are similar to those discussed for FIG. 4 above, the components may be configured differently to meet the needs of a certain vehicle.

Figure 6:
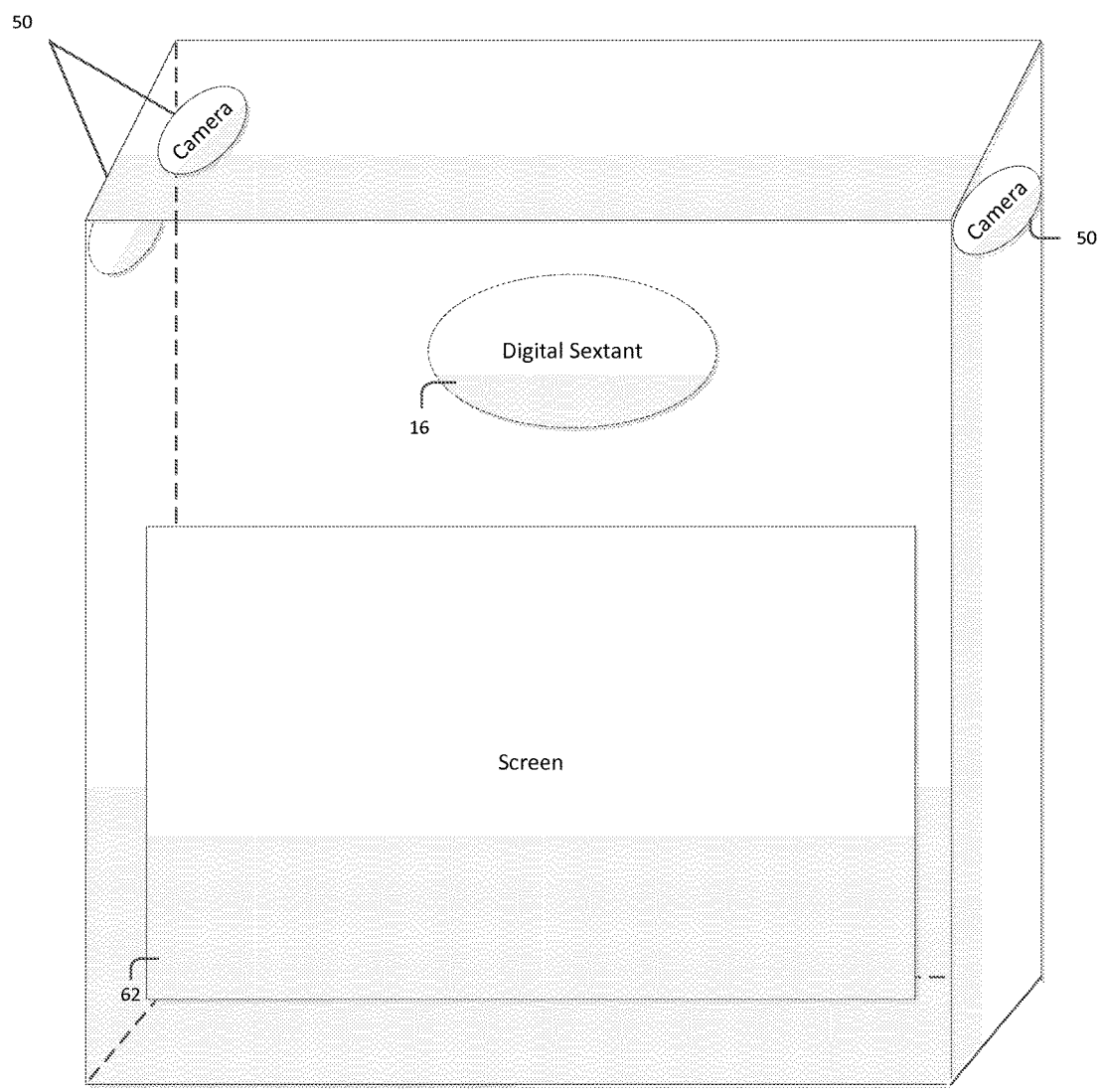
FIG. 6 shows a diagram of a handheld photo-optic comparative geolocation system in accordance with one embodiment of the present invention.

FIG. 6 shows a diagram of a handheld photo-optic comparative geolocation system in accordance with one embodiment of the present invention. In addition to mounting the system 10 on various objects, as discussed above, the system may be configured in a handheld device 64. The handheld device 64 may include a digital sextant 16, as described above. Further, the handheld device 64 may include at least one camera 50 for capturing surrounding images. Other components, such as a storage database 20 and data processor 18, may be included internally within the handheld device 64. Finally, the handheld device 64 may include a screen 62 for visual display of geolocation results. Different types of screens may be used, such as a simple digital display, a color screen capable of showing captured images, or a touch screen interface with the capability for a user to view and manipulate data.

Figure 7:
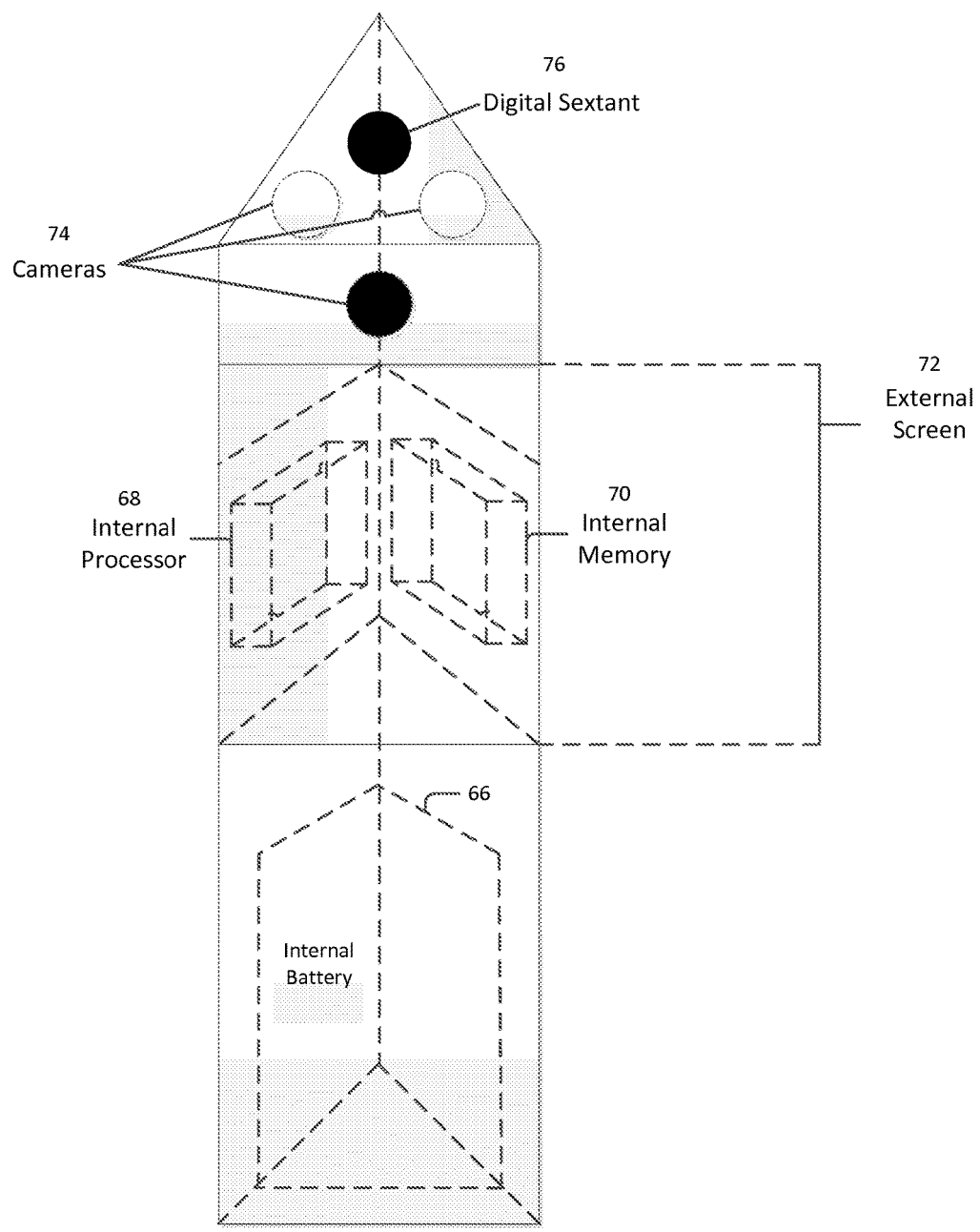
FIG. 7 shows an example of a handheld photo-optic comparative geolocation system in accordance with another embodiment of the present invention.

FIG. 7 shows an example of a handheld photo-optic comparative geolocation system in accordance with another embodiment of the present invention. In this embodiment, the handheld device 64 includes cameras 74, a digital sextant 76, and an external screen 72. The internal processor 68, internal memory 70, and internal battery 66 can all be seen within the handheld device 64. The handheld device 64 may also include additional components, such as sensors for a compass or gyroscope. It is contemplated that the handheld device 64 may include other capabilities aside from geolocation calculation. For example, the handheld device 64 may be a smartphone or other type of personal device, allowing for a more cost-effective means of implementing the present invention.

Additional features of the present invention may include the use of internal application software to allow for the intelligent and automated comparison of surrounding image data with previously stored geolocation data. Also, it is contemplated that many types of identifiers may be stored by the system and used in the system's comparisons and analyses. For example, geophysical and architectural data are described above, but the system may also use ecological data such as native plants or animals in order to visually recognize surroundings and eliminate certain potential regions or areas.

Although the medium in which the system can be used has been described in a limited manner, the present invention may be implemented using a variety of means. As depicted in the exemplary embodiments, the present invention may be implemented by a microprocessor or the Internet. Moreover, the system may be carried out through a computer network, used within other types of data-exchange media or protocols, or performed on multithreaded applications. The volume of information processed, combined with the speed at which the information must be processed, makes the use of a computer advantageous. The computer system will typically have a processor, such as central processing unit (CPU), where the processor is linked to a memory, an input, and an output. A computer or computer network may include several other components as well. For example, the memory components may include a hard disc for non-transitory storage of information, as well as random access memory (RAM). The input components may include a keyboard, a touchscreen, a mouse, and a modem for electronic communication with other devices. The output components may include a modem, which may be the same modem used for the input or a different one, as well as a monitor or speakers. Many of the different components may have varying physical locations, but they are still considered a computer or computer network for purposes of this description. For example, the memory may be on a hard drive in the same physical device as the processor, or the memory component may be remotely located and accessed as needed using the input and output. The memory may also have one more programs to carry out the functions described previously.

The memory components may also have one or more databases along with related data.

In summary, the present invention of a photo-optic comparative geolocation system has at least the following advantages:

providing the standalone capability to determine geolocation of an object without the need for signal transmission of any type;

providing the capability to determine geolocation without outside detection, avoiding the need to jam tracking signals or take other types of precautionary measures;

providing the automated capability to intelligently compare stored data with optically captured data of surrounding environment in order to determine geolocation;

providing the cost-effective capability to adapt existing technology, such as a smartphone, to perform the functions of photo-optic comparative geolocation;

providing the capability to calculate geolocation without the need to subscribe to satellite, cellular, or other wireless or radio-based services; and providing the capability to calculate geolocation in a live manner, without delays typically associated with weak signals or other types of communication delays.

While the invention has been described with respect to a limited number of embodiments, those skilled in the art, having benefit of this disclosure, will appreciate that other embodiments can be devised which do not depart from the scope of the invention as disclosed here.

What is claimed is:

1. A photo-optic comparative geolocation apparatus, comprising:
   a. an optic sensor that captures surrounding location data;
   b. an interface that maps the optic sensor data;
   c. a storage database containing prior optical and location data;
   d. a standalone digital sextant that provides data calculated using magnetic or celestial references; and
   e. a data processor that dynamically compares the mapped data to stored data and calculates current location based on the comparison analysis and digital sextant data.

2. The apparatus of claim 1, wherein the digital sextant comprises an internal compass and an internal gyroscope for stabilization.

3. The apparatus of claim 2, wherein the digital sextant further comprises a sextant camera that captures images of celestial objects.

4. The apparatus of claim 3, wherein the digital sextant further comprises a sextant storage database containing star and sky data.

5. The apparatus of claim 4, wherein the digital sextant further comprises a sextant processor that compiles and compares data from the sextant storage database and sextant camera.

6. The apparatus of claim 1, further comprising:
   f. a location assessment report created by the data processor.

7. The apparatus of claim 1, further comprising:
   g. a visual display for output from the data processor.

8. The apparatus of claim 1, wherein the location data comprises reference points and images.

9. A photo-optic comparative geolocation apparatus, comprising:
   a. a camera for capturing surrounding image data, the camera located within an enclosure;
   b. an internal compass within the enclosure;
   c. a memory containing stored image and location data, the memory located within the enclosure;
   d. a data processor that performs dynamic comparison analyses of the stored data and camera data, the data processor located within the enclosure; and
   e. a screen to visually display output from the data processor.

10. The apparatus of claim 9, wherein the screen is located on an external surface of the enclosure.

11. The apparatus of claim 9, wherein the screen is located on a remote user device.

12. The apparatus of claim 9, further comprising:
   f. an internal power source that provides power to the apparatus in the event of an external power source failure.

13. The apparatus of claim 9, further comprising:
   g. an internal digital sextant that provides the data processor with additional location information based on magnetic or celestial references.

14. A photo-optic comparative geolocation apparatus, comprising:
   a. a camera for capturing surrounding image data;
   b. a digital sextant, the digital sextant comprising an internal compass and internal gyroscope;
   c. a memory containing stored image and location data, wherein the location data comprises at least one of ecological data, topographical data, landscape image data or architectural data;
   d. a data processor that performs dynamic comparison analyses of the stored image and location data; and
   e. a screen to visually display output from the data processor.

15. The apparatus of claim 14, wherein the screen is located on an external surface of the enclosure.

16. The apparatus of claim 14, wherein the screen is located on a remote user device.

17. The apparatus of claim 14, further comprising:
   a. an internal power source that provides power to the apparatus in the event of an external power source failure.

* * * * *